UNITED STATES PATENT OFFICE.

FRANK J. TONE AND THOMAS B. ALLEN, OF NIAGARA FALLS, NEW YORK, ASSIGNORS TO THE CARBORUNDUM COMPANY, OF NIAGARA FALLS, NEW YORK, A CORPORATION OF PENNSYLVANIA.

METHOD OF MANUFACTURING CRYSTALLINE ALUMINA.

1,044,296.     Specification of Letters Patent.     Patented Nov. 12, 1912.

No Drawing.     Application filed August 30, 1911. Serial No. 646,862.

*To all whom it may concern:*

Be it known that we, FRANK J. TONE and THOMAS B. ALLEN, both residents of Niagara Falls, in the county of Niagara and State of New York, have invented the Method of Manufacturing Crystalline Alumina, of which the following is a specification.

Our invention has relation to crystalline alumina and improvement in the manufacture thereof; and is designed to provide a fused crystalline alumina which contains but a very small percentage of the metalliferous oxid used in its production, and which is substantially free from suboxid or carbid of aluminum or other impurities, and which will possess other advantages hereinafter pointed out.

Our invention is also designed to provide a method of producing this material which can be carried out in an efficient and economical manner.

The smelting of any aluminous ores, such as bauxite, emery, kaolin, and clay, in order to obtain pure alumina, is accompanied by many difficulties. It has been sought in various ways to prepare a pure crystalline alumina having refractory and abrasive properties by performing a differential reduction with carbon on the aluminous ores above mentioned. If bauxite or emery be smelted with carbon, it is possible to reduce the oxids of iron and silicon in a substantially complete manner, but it is impossible to remove the oxid of titanium without reducing the alumina. As bauxite and emery contain from three to four per cent. of oxid of titanium, it is substantially impracticable to produce in this manner a stable crystalline alumina having more than 97 to 98% alumina.

If kaolin or clay be smelted with carbon, it has been found possible to produce a very pure product having over 99% alumina, as these ores contain practically no titanium oxid; but as they contain from 55 to 60% of silica, a large addition of iron oxid or other similar oxid must be made in order to reduce them efficiently; and it has been found very expensive and inefficient to carry out the production of pure alumina in this manner.

A well-known method of carrying out the purification of impure aluminous ores, is by solution in a caustic alkali, and after filtering off the impurities, subsequently precipitating, preferably by the use of carbon dioxid. By this method, it is possible to produce a very pure form of alumina, which is, however, in an amorphous condition. If this pure alumina be melted in an electric furnace, it will absorb carbon from the furnace hearth and electrodes; and while the product consists of crystalline alumina, it contains reduced alumina in the form of the carbid of aluminum, the suboxid of aluminum, or some other form of reduced aluminum. It is well-known that the presence of even a very small quantity—less than one per cent.—of aluminum carbid in crystalline alumina will cause the disintegration of the alumina into an impalpable powder having no abrasive properties.

We have discovered that if the pure amorphous alumina be melted with oxid of iron, or other similar metalliferous oxid, in sufficient quantity to destroy any carbid or suboxid of aluminum that is formed, we can obtain a crystalline product consisting of substantially pure alumina containing less than one-half of one per cent. of metalliferous oxid.

We will now proceed to describe the manner in which we prefer to practice our invention, using iron oxid as a suitable material to prevent the formation of aluminum carbid or suboxid, although, as above described, other easily reducible metalliferous oxids such as manganese oxid may be employed. Iron oxid has the advantage of being inexpensive, while the metallic iron has a high magnetic susceptibility which renders its removal from the crystalline alumina a relatively simple matter.

We take substantially pure amorphous alumina and add thereto about ten per cent. of iron oxid. This mixture is fed into an electric furnace, which is preferably, although not necessarily, of the type described in U. S. Patent to Frank J. Tone (one of the present applicants) No. 929,517, dated July 27, 1909. We prefer to operate the process on the resistance principle of heating, the charge forming a conducting path between the furnace electrodes, as we believe the formation of the reduction products of alumina is more easily prevented by this method. The mixture is gradually fed into the furnace until the furnace crucible is filled with the molten material. The molten iron produced during the smelting operation settles to the bottom of the furnace and may be tapped off from time to time. When the furnace is filled, the electric current is shut off, and the furnace is allowed to cool until the product is in solid form. It is then removed from the furnace and broken up. After being subjected to a suitable concentration and chemical treatment, preferably by passing the product through a magnetic concentrator, and then treating the partly purified material with a bath of hydrofluoric acid, the product consists of crystalline alumina containing from one-tenth to five-tenths per cent. of iron oxid, and substantially free from reduced alumina either in the form of metallic aluminum or suboxid or carbid of aluminum. The presence of this amount of metalliferous oxid impurity gives the product valuable physical properties and distinguishes it from products having a higher percentage of impurities. Our improved product has a less degree of toughness and greater hardness; and on account of this altered ratio of toughness to hardness, it is much better adapted for use as an abrasive in certain grinding operations and in metal cutting. The presence of this amount of oxidized impurities also insures the absence of reduction products, and thus contributes to the stability and non-distintegrating properties of the product, and which are properties not possessed in the same degree by the fused lumina of higher purity. By reason of the absence of fluxing impurities in any substantial amount, the product also possesses valuable refractory qualities.

We do not desire to limit ourselves to the precise method of carrying out our invention herein described, as many changes may be made in the details thereof by those skilled in the art without departing from the spirit and scope of our invention, as defined in the appended claims.

We claim:—

1. In the manufacture of crystalline alumina, the improvement which consists in melting pure amorphous alumina with an easily reducible metalliferous oxid in an electric furnace, thereby reducing the major portion of the oxid to metallic form and fusing the alumina.

2. In the manufacture of crystalline alumina, the improvement which consists in melting a mixture of pure alumina with sufficient metalliferous oxid to prevent the formation of reduction products of alumina.

3. In the manufacture of crystalline alumina, the improvement which consists in melting a mixture of pure alumina with sufficient metalliferous oxid to prevent the formation of carbid or suboxid of aluminum.

4. In the manufacture of crystalline alumina, the improvement which consists in melting a mixture of pure alumina with sufficient iron oxid to prevent the formation of any reduction products of alumina.

5. In the manufacture of crystalline alumina, the improvement which consists in melting a mixture of pure amorphous alumina with sufficient iron oxid to prevent the formation of carbid or suboxid of aluminum.

6. In the manufacture of crystalline alumina, the improvement which consists in melting pure amorphous alumina with an easily reducible oxid, and reducing the major portion of the oxid to thereby produce a fused alumina containing not less than one-tenth per cent., nor more than five-tenths per cent., of the said metalliferous oxid and which is substantially free from other impurities.

7. In the manufacture of crystalline alumina, the improvement which consists in forming a conductive charge of pure amorphous alumina and metalliferous oxid between the electrodes of an electric resistance furnace, and reducing the major portion of the metalliferous oxid, thereby producing a fused alumina containing not less than one-tenth per cent., nor more than five-tenths per cent., of the said oxid, and which is substantially free from other impurities.

In testimony whereof, we have hereunto set our hands.

FRANK J. TONE.
THOS. B. ALLEN.

Witnesses as to Frank J. Tone:
 PRESCOTT SIMPSON,
 A. S. BAXDRONI.
Witnesses as to Thomas B. Allen:
 FRED I. PIERCE,
 C. H. GREENWOOD.